(12) United States Patent  
Katano et al.

(10) Patent No.: US 7,777,762 B2  
(45) Date of Patent: Aug. 17, 2010

(54) IMAGE PROCESSING DEVICE AND METHOD FOR DESIGN

(75) Inventors: Yasuo Katano, Kawasaki (JP); Tsuyoshi Kuroki, Tokyo (JP); Shuichi Yabu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 11/480,884

(22) Filed: Jul. 6, 2006

(65) Prior Publication Data

US 2007/0024610 A1    Feb. 1, 2007

(30) Foreign Application Priority Data

Jul. 15, 2005    (JP)    ............................. 2005-207135  
Jun. 9, 2006    (JP)    ............................. 2006-161028

(51) Int. Cl.  
    *G09G 5/00*    (2006.01)
(52) U.S. Cl. ........................ 345/632; 345/421; 345/619; 345/629; 345/633; 345/634
(58) Field of Classification Search ................. 345/619; 707/104.1  
    See application file for complete search history.

(56) References Cited

U.S. PATENT DOCUMENTS

| | | | | |
|---|---|---|---|---|
| 5,574,836 | A | * | 11/1996 | Broemmelsiek ............ 345/427 |
| 6,476,821 | B2 | * | 11/2002 | Sawada et al. ............... 345/620 |
| 6,738,060 | B2 | | 5/2004 | Ujiie et al. .................... 345/420 |
| 6,970,166 | B2 | | 11/2005 | Kuroki et al. ................ 345/428 |
| 7,391,424 | B2 | * | 6/2008 | Lonsing ....................... 345/633 |
| 7,397,481 | B2 | | 7/2008 | Endo et al. ................... 345/632 |
| 7,411,588 | B2 | * | 8/2008 | Kuroki et al. ................ 345/428 |
| 2002/0130861 | A1 | | 9/2002 | Ujiie et al. .................... 345/420 |
| 2005/0024360 | A1 | * | 2/2005 | Abe et al. ..................... 345/419 |
| 2005/0212801 | A1 | | 9/2005 | Kuroki et al. ................ 345/428 |

(Continued)

FOREIGN PATENT DOCUMENTS

CN    1604026    4/2005

(Continued)

OTHER PUBLICATIONS

J. Berta, "Integrating VR and CAD" (XP002376258), Projects in VR, IEEE Computer Graphics and Applications, vol. 19, No. 5, pp. 14-19 (Sep. 5, 1999).

(Continued)

*Primary Examiner*—Antonio A Caschera  
(74) *Attorney, Agent, or Firm*—Fitzpatrick, Cella, Harper & Scinto

(57) ABSTRACT

There is provided an integrated information management system which mutually associates the information processing applications for processing the data derived from CAD data with others. In the integrated information management system, the virtual design data generated in a CAD system, the data used in a CAE system, the data used in a DMR system, and the data used in a mockup system are stored in correspondence with the respective conditions used in case of respectively displaying these data. Then, the image acquired by compositing the respective data is generated based on the respective conditions, and the generated image is displayed on an integrated display unit, whereby it is possible for a user to manage these data as the single data by dynamically changing over the data of the respective information processing applications.

9 Claims, 12 Drawing Sheets

U.S. PATENT DOCUMENTS

| | | | |
|---|---|---|---|
| 2006/0221098 A1 | 10/2006 | Matsui et al. | 345/633 |
| 2007/0006091 A1 | 1/2007 | Sakagawa et al. | 715/771 |

FOREIGN PATENT DOCUMENTS

| | | |
|---|---|---|
| DE | 199 25 462 | 2/2001 |
| EP | 1 241 876 | 9/2002 |
| EP | 1 521 215 | 4/2005 |
| EP | 1 521 216 | 4/2005 |
| GB | 3 307 547 | 5/1997 |
| JP | 2005-107698 | 4/2005 |

OTHER PUBLICATIONS

G. Van Maren, et al., Integrating 3D-GIS and Virtual Reality Design and Implementation of the Karma VI System (XP002426374), Proceedings of the Spatial Information Research Centre's 10 Colloquium, pp. 343-352 (Nov. 19, 1998).

F. Karam, et al., CATIA V5 Document Types (XP002426375), Thomson Delmar Learning, pp. 15-22 (2003).

Gehry Technologies, "Digital Project VI, R2" (XP002426376), pp. 435-448 (2004).

M. Roder, et al., "3D-Digitalisierung im Werkzeug-und Formenbau" (XP002381669), vol. 145, No. 10, pp. 62-65 (Oct. 10, 2003).

* cited by examiner

IMAGE PROCESSING DEVICE AND METHOD FOR DESIGN

BACKGROUND OF THE INVENTION

1. Field of the Invention

The present invention relates to an image processing device and method. More particularly, the present invention relates to the image processing device and method which generate a display image to be displayed in case of executing, by using data generated from generated design data, a verification operation for the design data in a real space.

2. Related Background Art

Conventionally, design and verification operations which use virtual data are executed on a computer system in design and manufacture fields. More specifically, in the procedure of the design and verification operations, basic designing is first executed on a three-dimensional CAD (Computer Aided Design) system. Typically, when a shape, a figure and the like of a target are designed by using the three-dimensional CAD system, the designed data is generally stored as the solid data which is inherent in the relevant three-dimensional CAD system.

Then, based on the data designed by the relevant three-dimensional CAD system, an analysis process or a CAE (Computer Aided Engineering) process is executed to verify the validation of the designed data. Thus, the problems such as a heat radiation problem, a pressure deformation problem and the like which generally occur when actual products are used are previously extracted at the stage of virtual data, and it considers how to cope with these problems.

Moreover, in order to simultaneously verify operability, maintenance performance and assembly performance of the product which is designed by the three-dimensional CAD system, a simple production prototype (i.e., a mockup) or an actual production prototype is created by using an aluminum material and a resin foam material in a rapid prototyping method or the like. For this reason, the design data of the mockup is created and generated based on the data designed by the three-dimensional CAD system. For example, such an operation is clearly disclosed in Japanese Patent Application Laid-Open No. 2005-107968.

In practice, the problem of the current design data is clarified by actually executing design review or a DMR (Digital Mockup Review) process for the real thing and the virtual data, and the clarified problem is fed back on the design, whereby the quality of the product data is improved. In such an operation, the data concerning the mockup and the CAE process are positively used.

In recent years, attempts at making zero or reducing as much as possible the number of times of experimental production in the flow of the design operation are positively executed. That is, by decreasing the number of times of experimental production, the proportion of the number of production prototypes in the development cost of the products can be reduced. In consequence, the quality of the product can be maintained even under the situation that the production prototype cannot be made a number of times because, for example, the product to be developed is a single item, or the product to be developed is the product which is produced through the large item small volume production. Moreover, by shortening an experimental period, it is possible to execute the design operation capable of corresponding to an early product development cycle. To achieve this, it is necessary to provide the system which verifies all the necessary data in a virtual space without producing an actual production prototype, by maximally using the design data, the data derived from the relevant design data and concerning the CAE process, and the measured data.

However, in such a design system, the different dedicated information processing application has been developed and is used for each of the designing process by the CAD system, the CAE process, the mockup production process, the data measurement processes necessary for the above processes, and a design review process. For this reason, in the present circumstances, each of the dedicated information processing applications independently executes the data management. Consequently, for example, in the design review, the three-dimensional CAD data and the information processing applications (for the DMR process, the CAE process, the mockup production operation, etc.) derived from the CAD data cannot be integrally managed and displayed. For this reason, in the attempts at making zero or reducing as much as possible the number of times of experimental production, it is greatly impeded to execute the verification operation wholly in the virtual space.

Moreover, since the data management cannot integrally be executed, the following problems occur.

(1) In the method of producing the simple production prototype (i.e., the simple mockup) by a rapid prototyping device or the like, it is effective to grasp a rough shape due to restrictions such as machining accuracy, materials and the like. However, in this method, the detailed information which represents the details of a design, the details of a shape, colors and the like, and is designed on the three-dimensional CAD system cannot be reproduced.

(2) Even in the attempts at making zero or reducing as much as possible the number of times of experimental production, the necessity for actually producing the production prototype and the mockup is not completely gone in the present circumstances. For this reason, in a case where the production prototype or the mockup is actually produced, if the designed data is corrected as a result of the design review, the production prototype or the mockup which is actually produced is different from that defined by the designed data, whereby data inconsistency occurs.

(3) In the process of the design review, in a case where the design data being virtual data is superposed on the formed mockup, the process of superposing the virtual data on the image data of the mockup which was taken by a video camera is executed. However, since the video image is two-dimensional, a concealment problem occurs between the video image data and the three-dimensional virtual data.

SUMMARY OF THE INVENTION

The present invention has been completed in consideration of the above conventional problems, and an object thereof is to effectively execute designing by displaying virtual design data and the data generated by using the relevant virtual design data, based on a display condition.

Further, another object of the present invention is to integrally manage virtual design data and an actual mockup in a real space and a virtual space, and the data generated by using the relevant design data.

Furthermore, another object of the present invention is to properly display, to an observer, design data and the data generated by using the design data.

To achieve the above objects, an image processing device according to the present invention is characterized by comprising:

a design data storage unit adapted to store design data of a product;

a mockup data generation unit adapted to generate mockup data to be used for forming a mockup, from the design data;

a mockup data storage unit adapted to store the generated mockup data;

a condition storage unit adapted to store conditions used in case of respectively displaying the design data and the mockup data;

a display image generation unit adapted to generate a display image from the design data and the mockup data, based on the conditions;

an image reception unit adapted to receive an input image input by an image input unit;

a composition unit adapted to composite the display image generated by the display image generation unit and the input image received by the image reception unit; and a display control unit adapted to display on a display unit the image acquired by the composition by the composition unit.

Further, an image processing device according to the present invention is characterized by comprising:

a design data storage unit adapted to store design data of a product;

an analysis data generation unit adapted to generate analysis data to be used for analysis, from the design data;

an analysis data storage unit adapted to store the generated analysis data;

a result data storage unit adapted to store analysis result data analyzed based on the analysis data;

a condition storage unit adapted to store conditions used in case of respectively displaying the design data, the analysis data and the analysis result data;

a display image generation unit adapted to generate a display image from the design data, the analysis data and the analysis result data, based on the conditions;

an image reception unit adapted to receive an input image input by an image input unit;

a composition unit adapted to composite the display image generated by the display image generation unit and the input image received by the image reception unit; and a display control unit adapted to display on a display unit the image acquired by the composition by the composition unit.

Furthermore, an image processing device according to the present invention is characterized by comprising:

a design data storage unit adapted to store design data of a product;

a simplification data generation unit adapted to generate plural simplification data respectively having different simplifications, from the design data;

a simplification data storage unit adapted to store the generated plural simplification data;

a condition storage unit adapted to store conditions used in case of respectively displaying the design data and the plural simplification data;

a display image generation unit adapted to generate a display image from the design data and the plural simplification data, based on the conditions;

an image reception unit adapted to receive an input image input by an image input unit;

a composition unit adapted to composite the display image generated by the display image generation unit and the input image received by the image reception unit; and a display control unit adapted to display on a display unit the image acquired by the composition by the composition unit.

Moreover, an image processing method according to the present invention is characterized by comprising:

a mockup data generation step of generating mockup data to be used for forming a mockup, from design data of a product stored in a design data storage unit;

a mockup data storage step of storing the generated mockup data in a mockup data storage unit;

a display image generation step of generating a display image from the design data and the mockup data, based on conditions used in case of respectively displaying the design data and the mockup data;

an image reception step of receiving an input image input by an image input unit;

a composition step of compositing the generated display image and the received input image; and a display step of displaying on a display unit the image acquired by the composition.

Moreover, an image processing method according to the present invention is characterized by comprising:

an analysis data generation step of generating analysis data to be used for analysis, from design data of a product stored in a design data storage unit;

an analysis data storage step of storing the generated analysis data in an analysis data storage unit;

a result data storage step of storing, in a result data storage unit, analysis result data analyzed based on the analysis data;

a display image generation step of generating a display image from the design data, the analysis data and the analysis result data, based on conditions used in case of respectively displaying the design data, the analysis data and the analysis result data;

an image reception step of receiving an input image input by an image input unit;

a composition step of compositing the generated display image and the received input image; and a display step of displaying on a display unit the image acquired by the composition.

Moreover, an image processing method according to the present invention is characterized by comprising:

a simplification data generation step of generating plural simplification data respectively having different simplifications, from design data of a product stored in a design data storage unit;

a simplification data storage step of storing the generated plural simplification data in a simplification data storage unit;

a display image generation step of generating a display image from the design data and the plural simplification data, based on conditions used in case of respectively displaying the design data and the plural simplification data;

an image reception step of receiving an input image input by an image input unit;

a composition step of compositing the generated display image and the received input image; and a display step of displaying on a display unit the image acquired by the composition.

DETAILED DESCRIPTION OF THE PREFERRED EMBODIMENTS

Hereinafter, one embodiment of the present invention will be explained in detail with reference to the attached drawings.

<Basic Constitution>

(System Configuration)

First of all, the system configuration for achieving the embodiment of the present invention will be explained.

Figure 1:
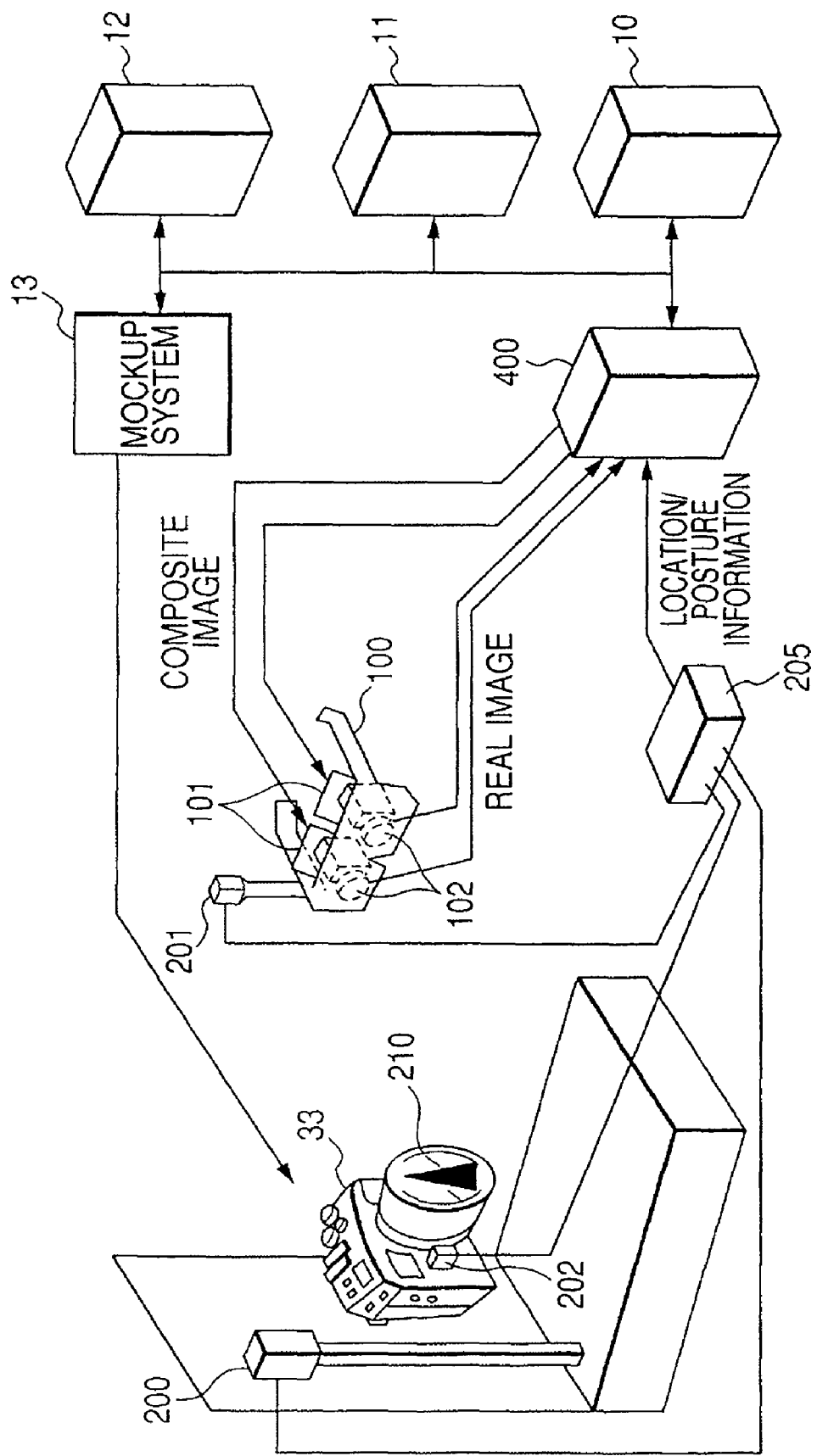
FIG. 1 is a diagram showing the system configuration for achieving an embodiment of the present invention.

FIG. 1 is a diagram showing the system configuration for achieving the embodiment of the present invention.

In FIG. 1, numeral 100 denotes a head mounted image input/output device such as an HMD (Head Mounted Display) or the like. That is, an observer or a user wears the HMD 100 on his head to observe the image which is acquired by compositing the image in a real space and the image in a virtual space.

Numeral 101 denotes image display devices which are built in the HMD 100, and numeral 102 denotes image input devices which are built in the HMD 100. Here, it should be noted that there are two sets of the image display device 101 and the image input device 102, that is, one for the right eye and the other for the left eye.

Further, a later-described magnetometric sensor 201 is mounted on the HMD 100. More specifically, the output from the magnetometric sensor 201 is input to a position/orientation measurement device 205, whereby the position/orientation measurement device 205 calculates the viewpoint position and the sight line direction (respectively corresponding to the position and the direction of the HMD 100) of the observer, and then generates the position/orientation information.

Numeral 400 denotes an information processing device which generates a CG (Computer Graphics) image corresponding to the position/orientation information calculated and generated by the position/orientation measurement device 205, superposes the generated CG image on the image output from the image input devices 102 of the HMD 100 to composite them, and then outputs the acquired composite image to the image display device 101.

Numeral 10 denotes a CAD system, numeral 11 denotes a CAE system, numeral 12 denotes a DMR system, and numeral 13 denotes a mockup system which are described above. In the state that the CAD system 10, the CAE system 11, the DMR system 12 and the mockup system 13 are being connected to the information processing device 400 through a network, various kinds of data are transferred. In any case, it is explained in the present embodiment that each of the CAD system 10, the CAE system 11, the DMR system 12 and the mockup system 13 has independent bodies. However, the present invention is not limited to this. That is, it is of course possible to constitute the CAD system 10, the CAE system 11, the DMR system 12 and the mockup system 13 all on the same chassis or in the same housing. Moreover, it is of course possible to achieve the CAD system 10, the CAE system 11, the DMR system 12 and the mockup system 13, by actuating the respective applications on the same device as the information processing device 400.

Incidentally, it should be noted that the information processing device 400, the CAD system 10, the CAE system 11, the DMR system 12 and the mockup system 13 are achieved by executing, on a computer which consists of a CPU (Central Processing Unit), a ROM (Read Only Memory), a RAM (Random Access Memory), a display device, an input device, an external storage device and the like, the applications which have been stored in the ROM or the external storage device and are to be used to achieve the respective systems.

Numeral 33 denotes a mockup which is produced or formed by a producer or a user based on the data generated by the mockup system 13.

Numeral 200 denotes a magnetic transmitter which generates a magnetic field, and each of numeral 201 and 202 denotes a magnetometric sensor which measures or detects a change of the magnetic field generated by the magnetic transmitter 200. Here, it should be noted that the magnetometric sensor 201 is mounted on the HMD 100 and the magnetometric sensor 202 is mounted on the mockup 33. The position/orientation measurement device 205 measures the position and the orientation of the magnetometric sensor 201 on the basis of the measurement result acquired therefrom, and measures the position and the orientation of the magnetometric sensor 202 on the basis of the measurement result acquired therefrom, whereby it is possible to measure the position and the orientation of each of the HMD 100 and the mockup 33.

Besides, a marker 210 is attached to the mockup 33. The marker 210 is used in case of acquiring the position and the orientation of the mockup 33 from the image input devices 102.

(Display According to Position and Orientation)

Figure 12:
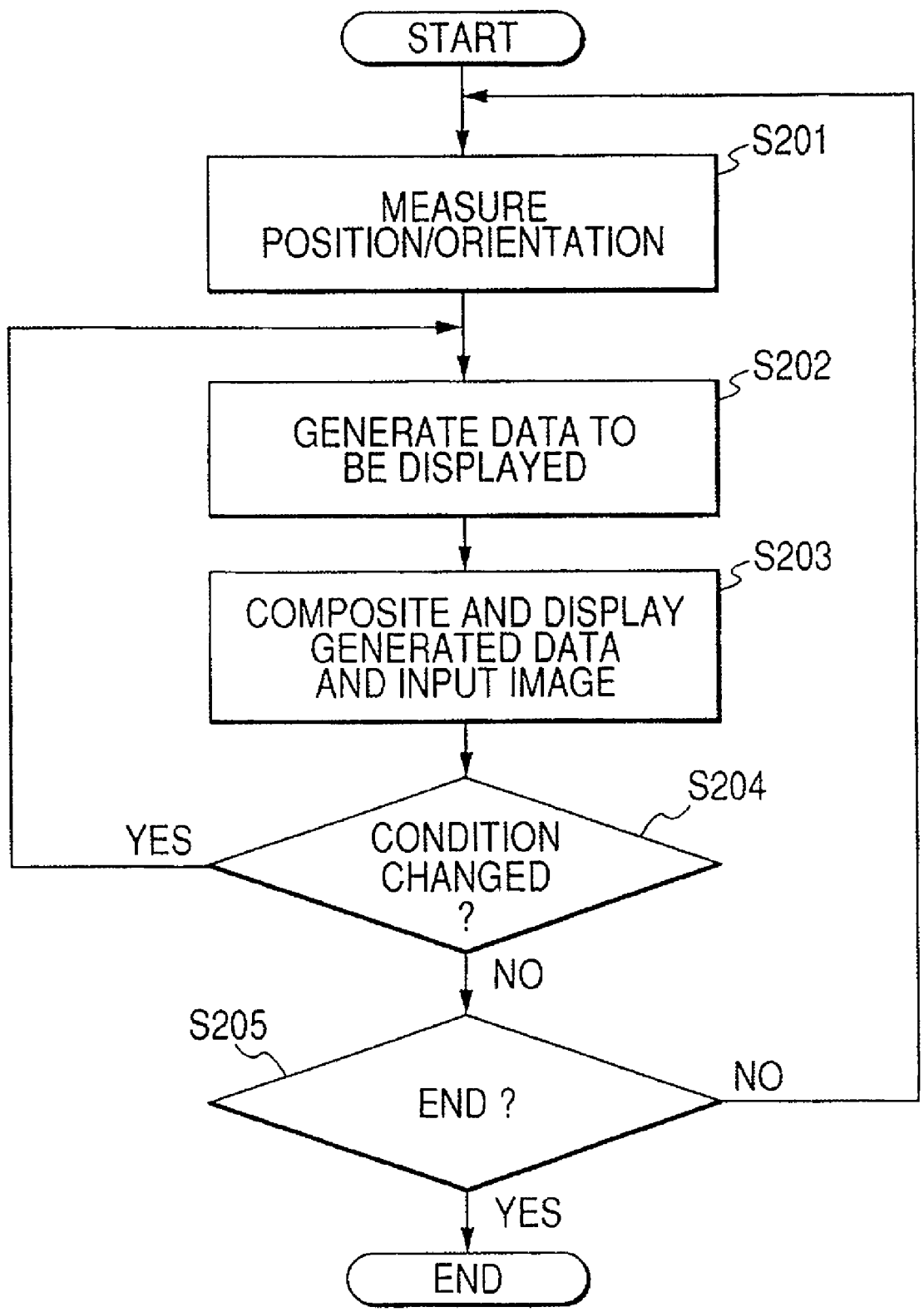
FIG. 12 is a flow chart for explaining the display depending on a location and a posture according to the embodiment of the present invention.

Subsequently, the display which depends on the position and the orientation of each of the HMD 100 and the mockup 33 in the embodiment will be explained with reference to FIG. 12. In particular, the process to be executed when an operator who is wearing the HMD 100 watches or looks at the mockup 33 will be explained in the following.

Initially, the positions and the orientations of the HMD 100 and the mockup 33 are measured by the marker 210, the position/orientation measurement device 205 and the like which are arranged in the real space, on the basis of the image information output from the image input devices 102, thereby generating the position/orientation information (step S201).

Then, based on the generated position/orientation information, the display data to be shown to the operator is generated from the virtual data by the information processing device 400 (step S202). Subsequently, the generated display data and the image which exists in the real space and was taken by the image input devices 102 are composited and displayed (step S203).

Next, it is judged whether or not the later-described condition (i.e., state management data) has been changed (step S204). Then, if it is judged that the later-described condition is not changed, the flow advances to a step S205.

Meanwhile, if it is judged that the later-described condition has been changed, the flow returns to the step S202. In the step S202, the display data is generated from the virtual data based on the condition (i.e., the state management data).

As described above, it is possible to measure the three-dimensional position information, in the virtual space, representing the mockup 33 (i.e., a simple production prototype) arranged in the real space, and it is thus possible to display the simple production prototype according to the measured result.

(Whole Operation)

Subsequently, the whole operation according to the embodiment of the present invention will be explained hereinafter with reference to FIGS. 2, 3, 4, 5, 6 and 11.

Figure 2:
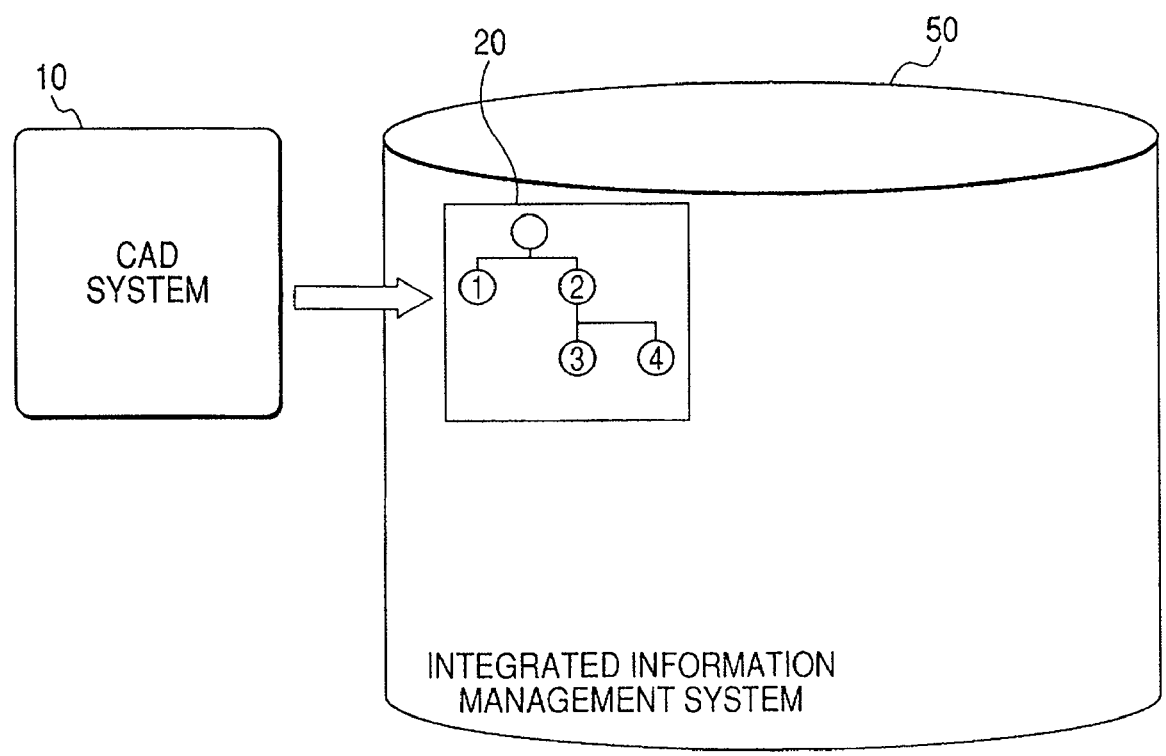
FIG. 2 is a diagram for explaining generation and storage of design data according to the embodiment of the present invention.

As shown in FIG. 2, virtual design data 20 which is the basis is first generated by the CAD system 10. According to the embodiment, in the generated virtual design data (i.e., CAD data) 20, it is assumed that one product comprises a unit 1 and a unit 2, and the unit 2 further comprises a unit 3 and a unit 4. Here, it should be noted that, in the drawings, each unit is illustrated as the circled number.

In any case, the virtual design data 20 generated by the CAD system 10 is stored in an integrated information management system 50 (step S110). For example, as the CAD data, the data which is generated by OSD (OneSpace Designer™) or the like which is the CAD application available from MSC. Software Corporation in United States.

Figure 3:
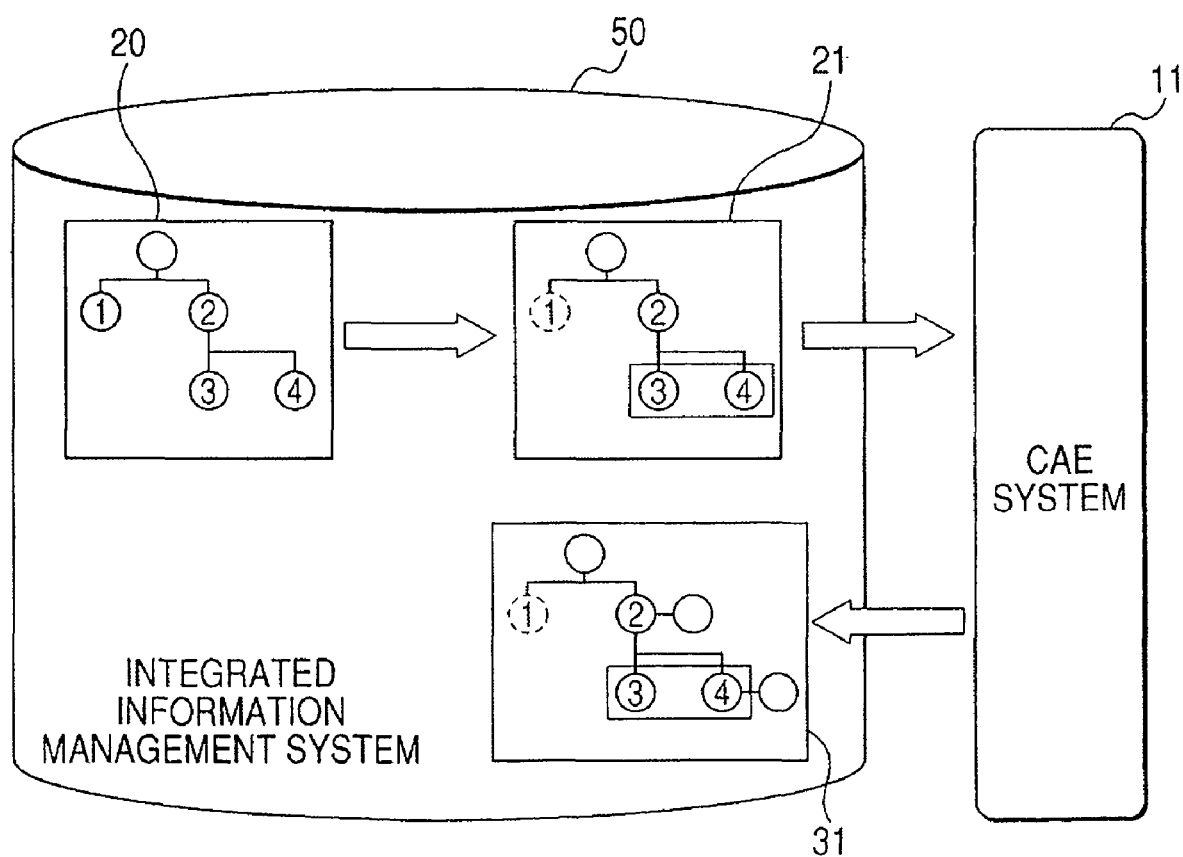
FIG. 3 is a diagram for explaining generation and storage of derived data according to the embodiment of the present invention.

Next, as shown in FIG. 3, in the integrated information management system 50, derivative data 21 which is derived from the virtual design data 20 is generated to be used in the CAE system 11 which executes various analysis calculations such as thermal fluid analysis, pressure analysis and the like, and the generated derivative data 21 is then stored (step S111). The derivative data 21 takes over the constitution of the units from the virtual design data 20, whereby the derivative data 21 has the data constitution corresponding to the virtual design data 20.

At that time, it is assumed that any problem that does not occur in the analysis calculations, even if the unit 3 and the unit 4 in the virtual design data 20 are integrated in the derivative data 21 or even if the data corresponding to the unit 1 in the virtual design data 20, does not exist in the derivative data 21.

In any case, the analysis calculation is executed by the CAE system 11 based on the derivative data 21. Then, the calculated result is stored as analysis data 31 in the integrated information management system 50 (step S112). Here, it should be noted that the CAE system is achieved by analysis software such as FLUENT™ available from Fluent Inc. in the United States.

Figure 4:
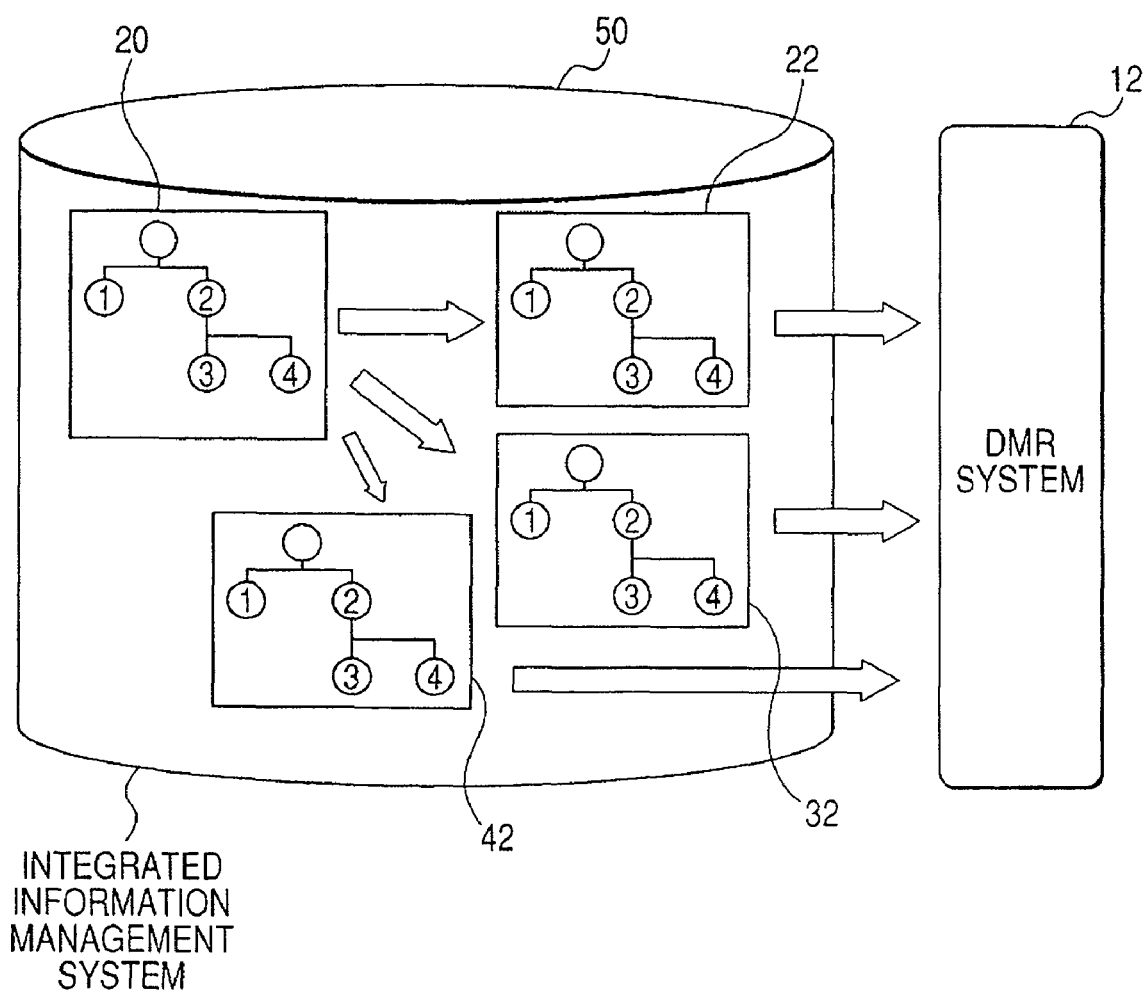
FIG. 4 is a diagram for explaining the generation and the storage of the derived data according to the embodiment of the present invention.

Moreover, as shown in FIG. 4, in the integrated information management system 50, the derivative data is generated from the virtual design data 20 and then stored so as to be used in the DMR system 12 which is used to execute design review (steps S121 and S122). Incidentally, the derivative data generated here are derivative data 22, 32 and 42 of which the details are different from others. Here, it should be noted that, in order to secure the real time of the derivative data 22, 32 and 42 in the design review, each of these data has been simplified with plural levels by decreasing the details of the data constituting the units, simplifying the color information, or the like. Further, it is assumed that the levels of the details of the derivative data satisfy the detail of the derivative data 22>the detail of the derivative data 32>the detail of the derivative data 42, that is, it can be understood that the derivative data 22 is the most detailed data.

Figure 5:
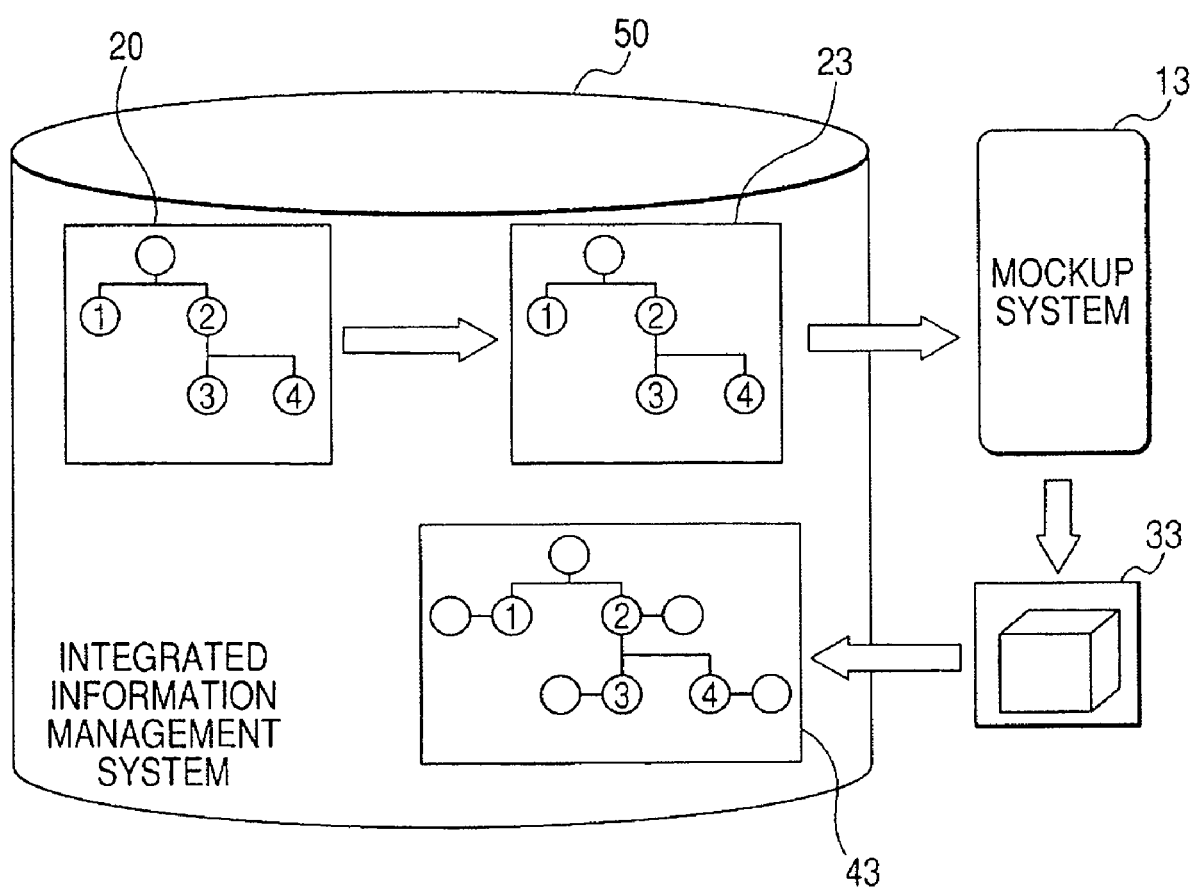
FIG. 5 is a diagram for explaining the generation and the storage of the derived data and storage of measured data, according to the embodiment of the present invention.

Next, as shown in FIG. 5, in order to review the real mockup based on the virtual design data 20, the mockup system 13 has the unique data format by which, for example, significant simplification is executed to the virtual design data 20, and the internal parts of the virtual design data 20 are deleted. Thus, it is possible to manufacture the real mockup with simple materials, in a short amount of time, and at a low cost.

More specifically, design data 23 for creating the mockup is derived from the virtual design data 20 by the mockup system 13, and the derived design data 23 is stored in the integrated information management system 50 (step S131). In addition, the real mockup 33 is created by a manufacturer or a user based on the derived design data 23.

Incidentally, the sensor is disposed on the created real mockup 33 so as to actually measure an airflow, a pressure and the like, and also to measure the position, the orientation and the like of the real mockup 33 existing in the real space. Then, the data representing such measured values is stored as actual-measured data 43 of the real mockup 33 (step S132).

In the present embodiment, the CAE data, the DMR data and the mockup data are explained by way of example as the derivative data to be stored in the integrated information management system 50. However, the nature of the present invention is not limited to this. That is, it is of course possible to use other kinds of derivative data.

Figure 6:
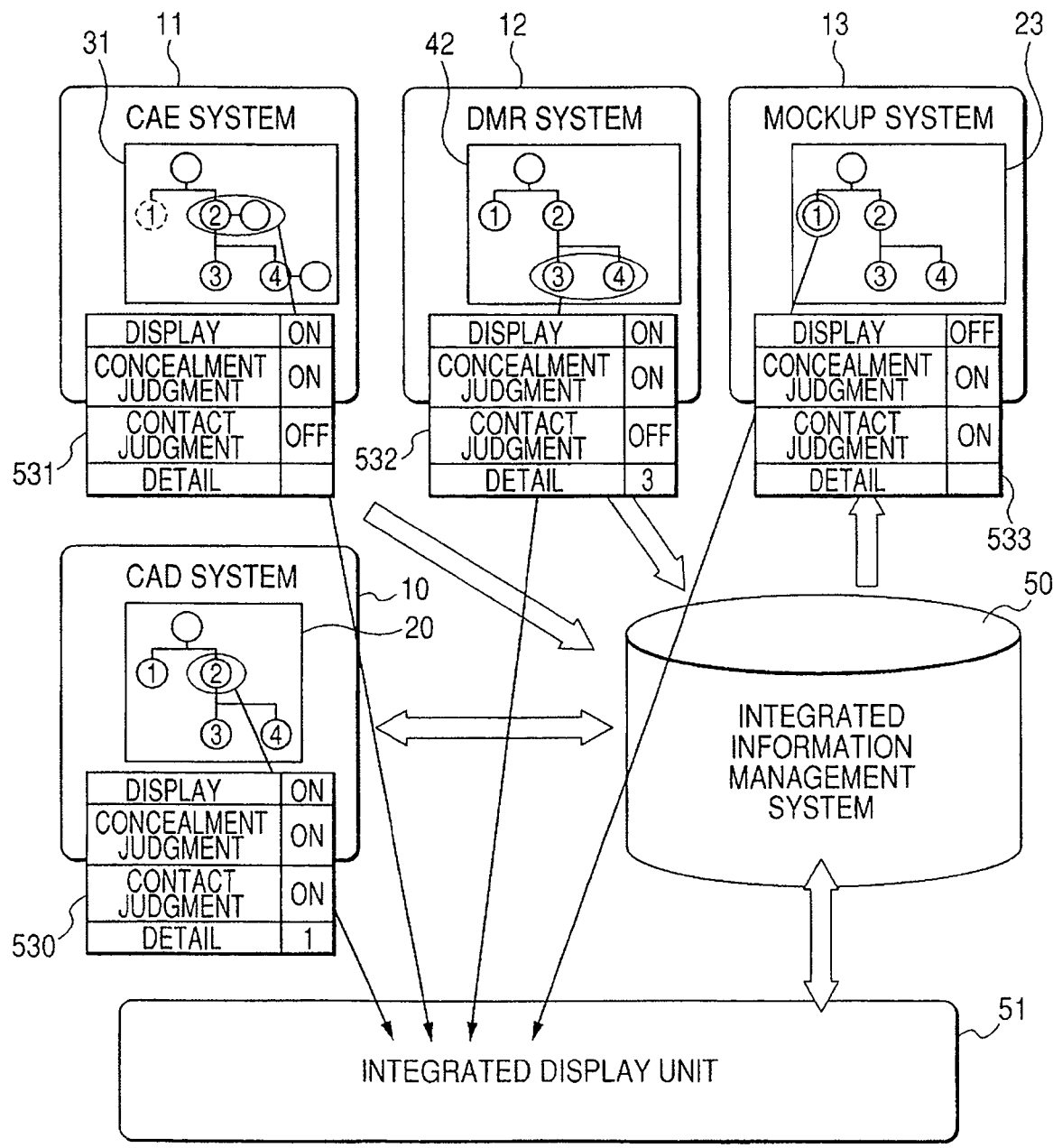
FIG. 6 is a diagram for explaining storage and display of each data according to the embodiment of the present invention.

Subsequently, as shown in FIG. 6, in order to evaluate the virtual design data 20 on the basis of the above derivative data, the data stored in the integrated information management system 50 is shown on an integrated display unit 51 according to need (step S200). Here, it should be noted that the actual process to be executed in the step S200 is the same as the process already explained with reference to FIG. 12.

At the same time, state management data 530, 531, 532 and 533 are provided and managed respectively with respect to the virtual design data 20, the analysis data 31, the derivative data 42 and the mockup design data 23. More specifically, each of the state management data 530, 531, 532 and 533 represents "display", "concealment judgment", "contact judgment" and "detail". Here, it should be noted that the observer can freely change each of the state management data 530, 531, 532 and 533, on the integrated display unit 51.

Incidentally, in the present embodiment, each of the state management data 530, 531, 532 and 533 is explained as representing "display", "concealment judgment", "contact judgment" and "detail". However, the nature of the present invention is not limited to this. That is, it is of course possible to include other kinds of state management data.

For example, as shown in FIG. 6, a case of currently paying attention to the unit 2 in the design review will be explained. In this case, the virtual design data 20 sent from the CAD system 10 is displayed on condition that the state management data 530 of the unit 2 represents "display=on", "concealment judgment=on" and "contact judgment=on".

In this state, it is assumed that the unit 1 has been created as the real mockup 33. In this connection, the state management data 533 of the mockup design data 23 in the mockup system 13 is set to represent "display=off", "concealment judgment=on" and "contact judgment=on", and another virtual design data is superposed on the real mockup 33 and then displayed in the integrated display unit 51. Besides, the units 3 and 4 which are not the target to be verified this time use the derivative data 42 of the DMR system 12, and "display=on", "concealment judgment=on", "contact judgment=off" and "detail=3" are set so as to use the low-detail data, whereby the real time of the design review is secured.

Moreover, while the design review is being executed, if the result (derivative) data 21 of the fluid analysis calculation executed by the CAE system 11 in regard to the unit 2 according to observer's need is set to "display=on" according to need, it is possible to confirm the analysis result.

(Change of State Management Data)

Subsequently, a change of the state management data will be explained hereinafter.

More specifically, the window through which the state management data is changed is displayed on the display screen of the information processing device 400, whereby the operator can indicate to change the state management data by using an input device.

As explained above, in the system according to the present embodiment, by managing and controlling the input and output data of the information processing application derived from the virtual design data 20 in the three-dimensional CAD system 10, it is possible to timely change over the necessary information in the verification process such as the design review or the like, whereby it is possible to construct the system which can execute evaluation in real time in the state which is close as much as possible to the completed product. Thus, it is possible to execute necessary correction at the instant of virtual data, and it is also possible to attempt at making zero or reducing as much as possible the number of times of experimental production.

Moreover, by using a composite reality system to the integrated display unit 51, the data disposed in the real space such as the real mockup 33 or the like can be managed by the integrated information management system 50 of the integrated design information management system. Thus, by managing the mockup design data 23 (i.e., mockup creation virtual data) for creating the mockup by the integrated display unit 51, it is possible to solve the concealment problem and the collision judgment which occur between the real mockup 33 and the virtual design data 20, and it is also possible to superpose the analysis data (CAE data) 31 and the derivative data (DMR data) 42 on the real mockup 33. As a result, it is possible to execute the design operation by few experimental productions.

<Example 1 of Design Review>

Subsequently, the display of the HMD 100 to be executed in case of executing the design review will be explained with reference to FIGS. 7, 8, 9 and 10.

Figure 7:
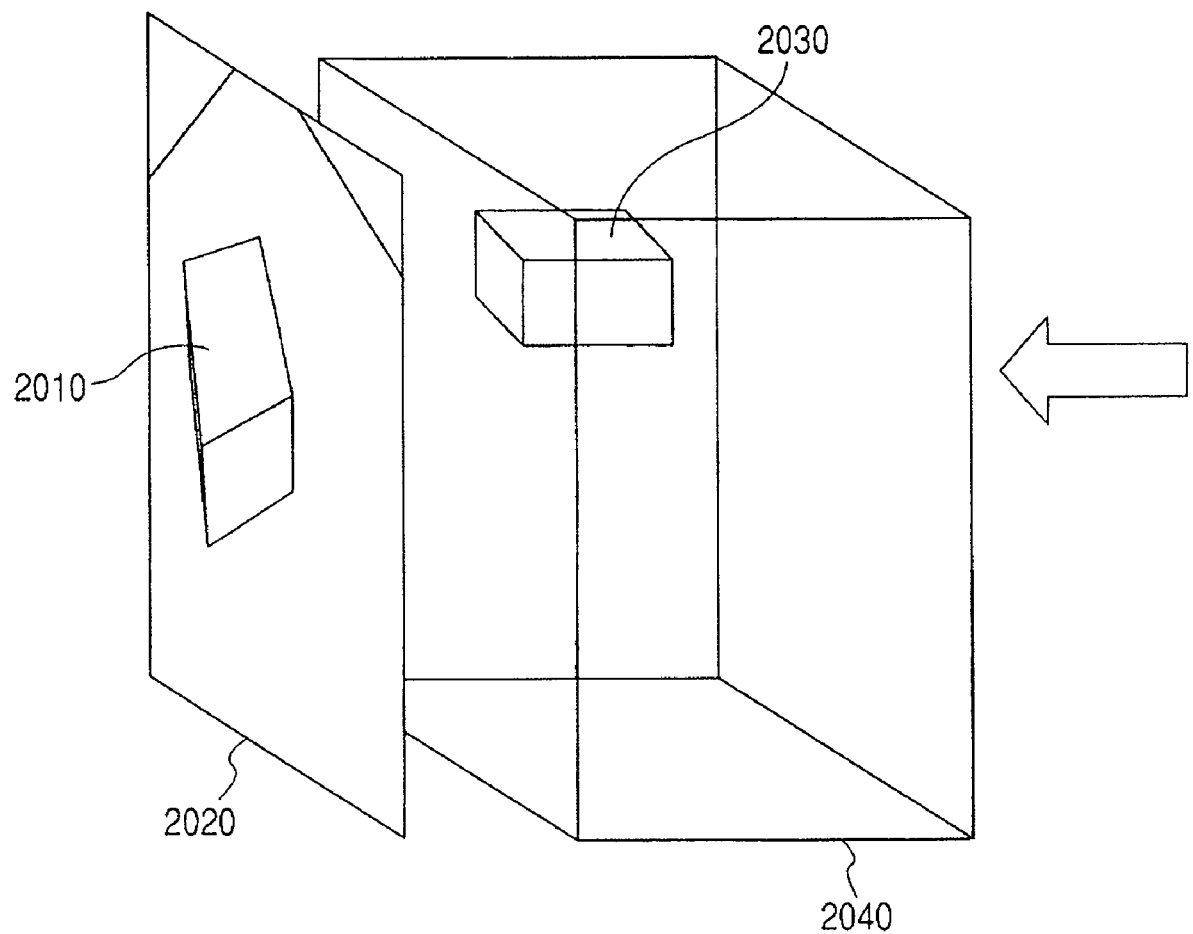
FIG. 7 is a diagram for explaining a conventional image in a real space and conventional virtual data in a virtual space.

That is, FIG. 7 shows the state that an image (real space image) 2020 which was taken by the image input devices 102 with respect to the mockup 33 disposed in the real space and virtual design data 2030 which is disposed in a virtual space 2040 are observed by using the HMD 100. More specifically, a mockup image 2010 taken with respect to the real mockup 33 is included in the real space image 2020, and the observer observes the relevant image from the direction indicated by the thick arrow.

Figure 8:
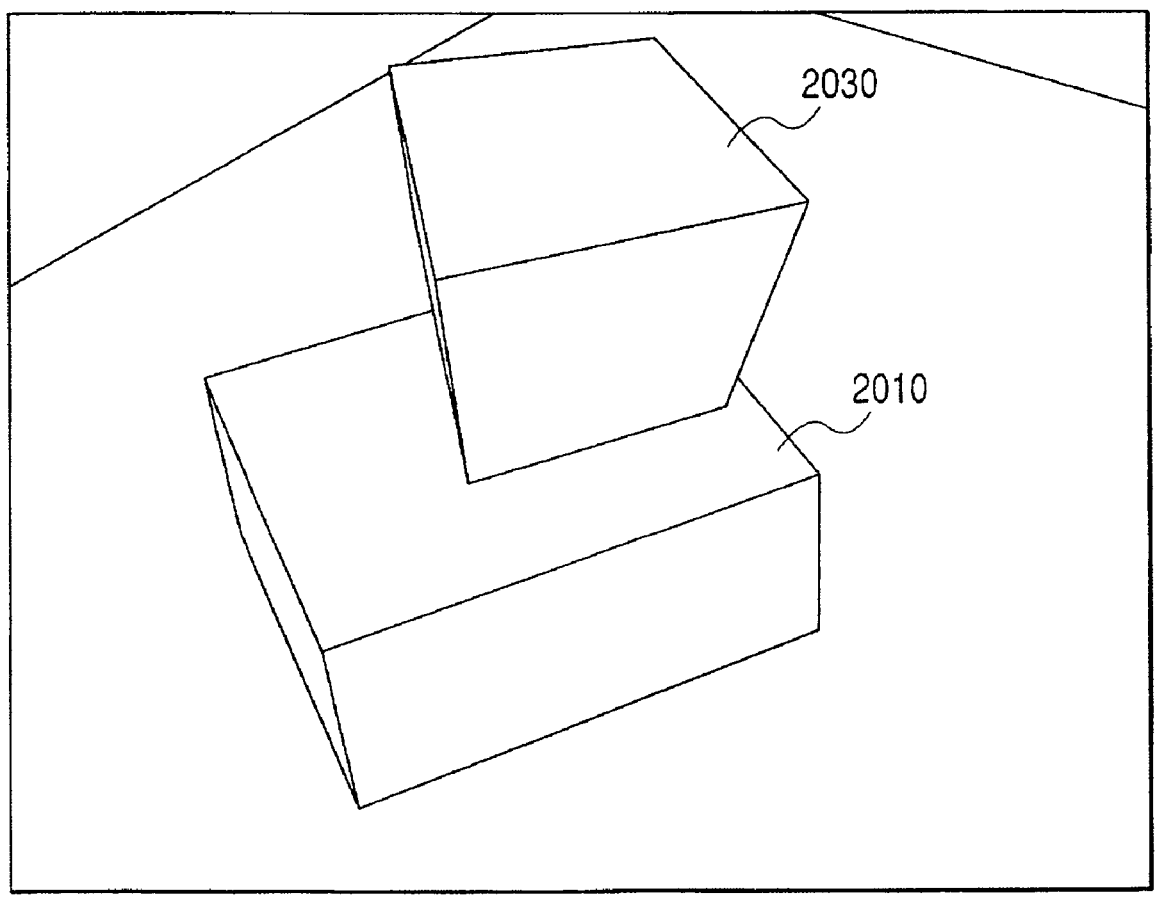
FIG. 8 is a diagram for explaining the state that the data shown in FIG. 7 are displayed.

Therefore, the mockup image 2010 and the virtual design data 2030 in the real space image 2020 are superposed mutually and displayed on the image display device 101, as shown in FIG. 8.

Under normal conditions, the real space image 2020 is disposed at the deepest point on the display screen, and the virtual design data 2030 is disposed in front of the real space image 2020. At that time, since the locational relation (overlap relation) between the mockup image 2010 and the virtual design data 2030 is unknown, there is a problem that the mockup image 2010 and the virtual design data 2030 are displayed in the state different from the state of the concealment relation between the properly disposed mockup image 2010 and the virtual design data 2030.

On the other hand, according to the present embodiment, since virtual mockup data 2050 used for creating the real mockup 33 is held in the integrated information management system 50, it is possible to solve such a concealment problem as above by using the held data.

That is, by using the actual-measured data 43 which is the spatial position and orientation information of the real mockup 33 and has been registered in the integrated information management system 50, the position and the orientation of the virtual mockup data 2050 are determined based on the locational information of the real mockup 33, and the acquired virtual mockup is disposed in the virtual space 2040.

Then, the state of the state management data of the virtual mockup data 2050 in the integrated information management system 50 is changed to the state of "concealment judgment=on", and the virtual mockup is disposed in the virtual space 2040.

Figure 9:
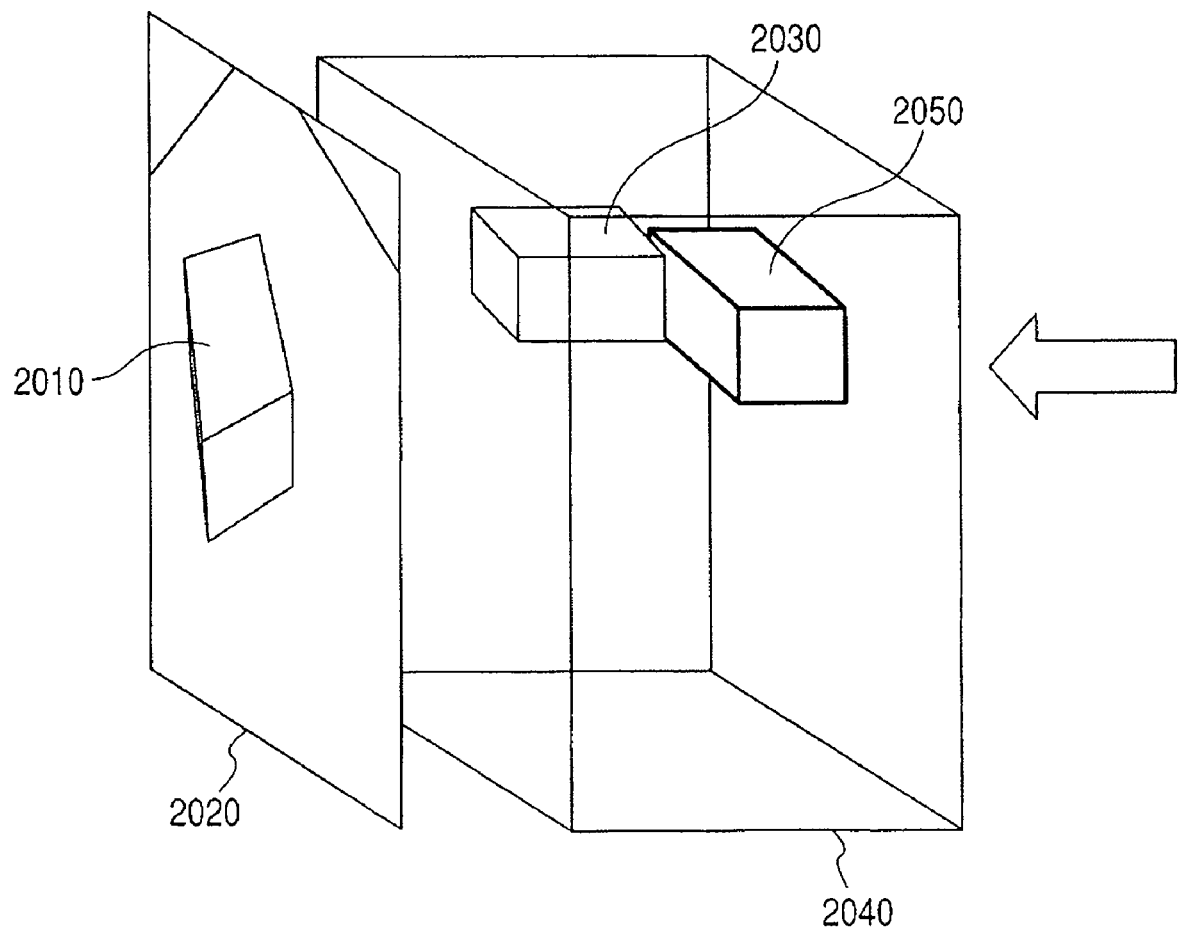
FIG. 9 is a diagram for explaining an image in the real space and virtual data in the virtual space, according to the embodiment of the present invention.
Figure 10:
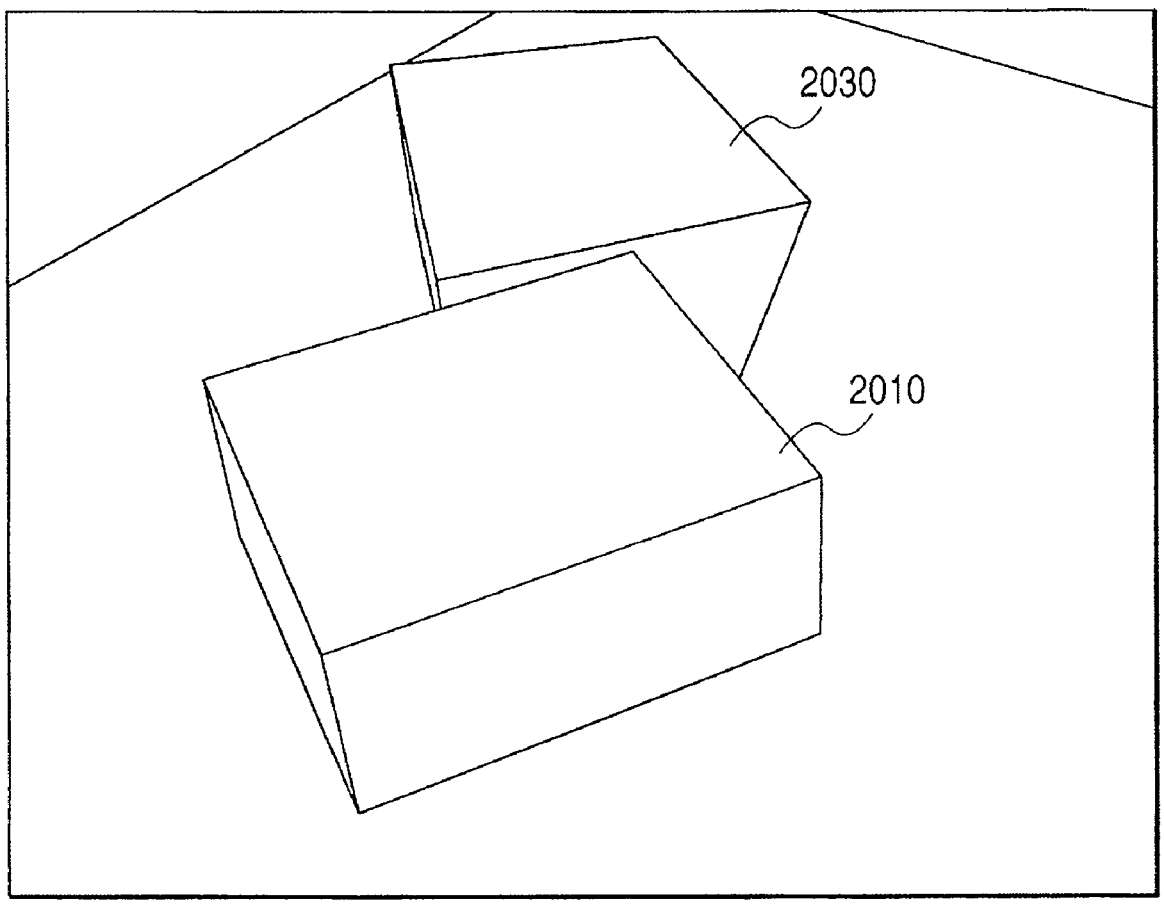
FIG. 10 is a diagram for explaining the state that the data shown in FIG. 9 are displayed.
Figure 11:
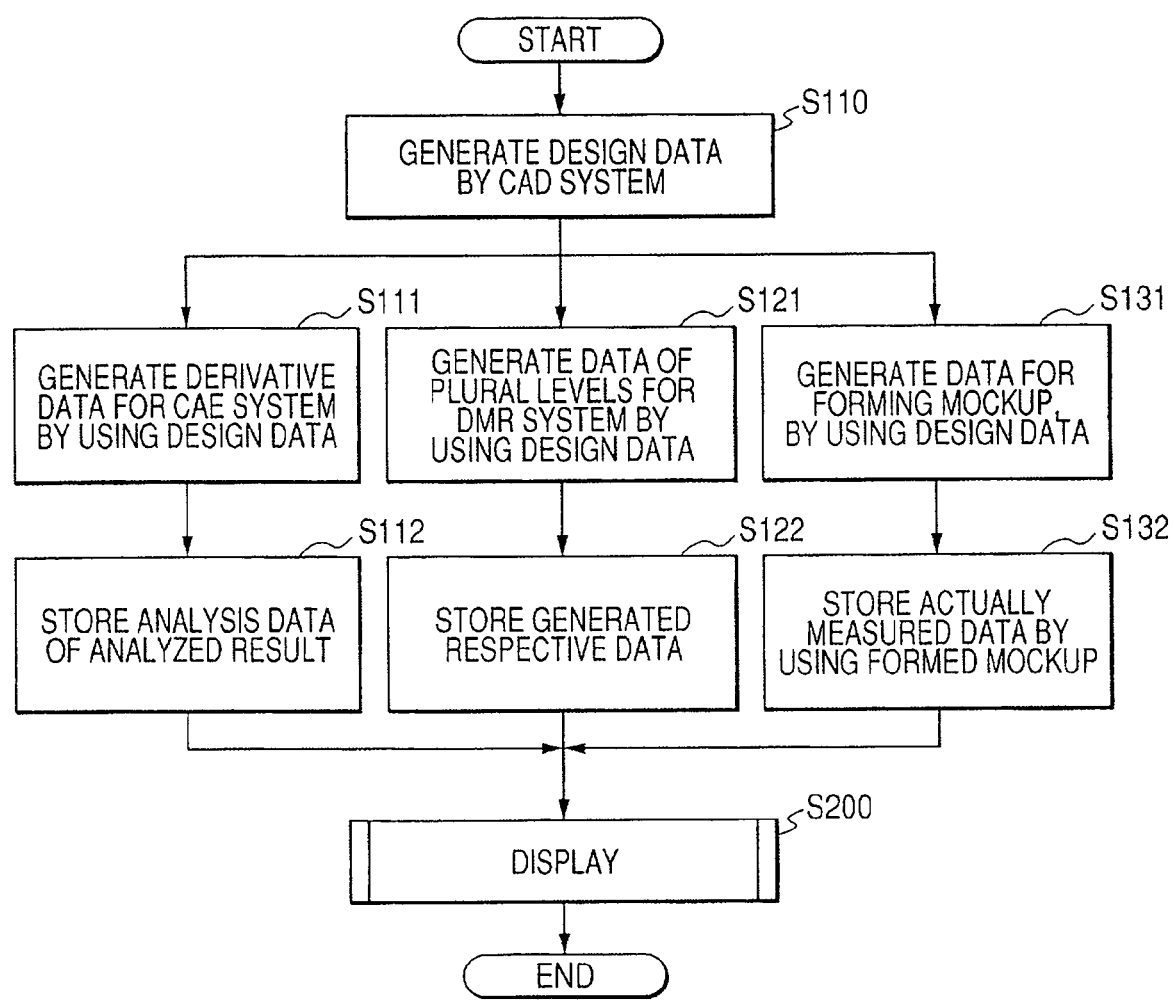
FIG. 11 is a flow chart for explaining the whole process according to the embodiment of the present invention.

Subsequently, the concealment of the virtual mockup data 2050 and the virtual design data 2030 is judged in the virtual space 2040, whereby the virtual design data 2020 is displayed in the state that the concealment judgment was normally executed (see FIG. 9).

Further, in this state, if the state management data of the virtual mockup data 2050 is changed to represent "display=off", the portion of the virtual mockup data 2050 is not displayed in the state that the concealment judgment was executed, whereby the real mockup 2030 at the deepest point is displayed resultingly on the display screen. For this reason, the display in the normal concealment state in the real space and the virtual space can be executed (see FIG. 10).

Incidentally, in the present embodiment, the HMD device is explained by way of example as the image input/output device by which the composite reality system is achieved. However, the nature of the present invention is not limited to this. That is, it is needless to say that the composite reality system can be achieved by another means. For example, even if the image input/output device is not mounted on the observer's head, the present invention can be achieved by fixedly providing the image input/output device at a certain location.

<Example in Case of Different Mockup Version>

In the design review in which the real mockup 33 is integrated, there is a case where the frequency of update of the real mockup 33 is different from the frequency of update of the virtual design data 20. That is, since it takes time and costs for producing or manufacturing the real thing such as the real mockup 33 or the like, the number of times of production tends to be reduced in recent years. For this reason, the data which has already been updated in the virtual design data 20 is not often reflected in the real mockup 33.

In that case, the virtual mockup design data 23 of the mockup is managed with respect to each version, the version of the virtual mockup design data 23 is changed over according to need, and the version-changed mockup design data is superposed on the real mockup 33, thereby enabling the observer to easily recognize such a difference in the real mockup 33.

<Example in Case of Judging Contact of Mockup>

In the virtual design review in which the real mockup 33 is integrated, a case of intending to execute the contact judgment between the real mockup 33 and the virtual design data 20 will be explained with reference to FIG. 6.

In case of verifying the operation of the mechanism in the executed condition between the unit 2 of the virtual design data 20 and the unit 1 for which the real mockup 33 has been created, the state of the virtual mockup design data 23 for creating the virtual mockup is changed to the state of "display=off", "concealment judgment=on" and "contact judgment=on", and the acquired data is disposed in the real mockup 33. Thus, the virtual design data 20 of the unit 2 is superposed on the real mockup of the unit 1 through the HMD 100, whereby the contact judgment between the data of the real unit 1 and the virtual unit 2 is executed in the virtual space. In other words, the relevant contact judgment is achieved on the integrated display unit 51.

<Control 1 of Detail in Design Review>

In case of executing the design review based on the virtual design data 20, the data capacity of the virtual design data 20 by the CAD system 10 tends to increase according to the progress of a design phase.

In this connection, as the CAD system develops in the future, it is supposed that an extensive increase of the data capacity cannot be avoided. However, even so, display performance of the display system cannot follow such a fact in the existing circumstances.

For this reason, the derivative data 22, 32 and 42 which are controlled to respectively represent the detail of the CAD data 10 with several levels are stored in the integrated information management system 50, and the stored derivative data are sequentially switched over so as to control the detail of the data.

For example, even in case of paying attention to the unit 2 in the design review, it is necessary to display other units so as to verify the location of the unit 2, connectivity of the wirings and the like in the whole constitution.

In this case, the detailed data of the virtual design data 20 is displayed with respect to only the unit 2 to which it pays attention, thereby enabling the observer to carefully study the unit 2.

Then, the detail is decreased with respect to each of the adjacent units 3 and 4, and the data of the simple derivative data 42 in which the detail has been decreased are displayed.

Moreover, it is assumed that there is provided the data in which only a part of the unit 1 is displayed because the unit 1 is located behind the unit 2 and the unit 1 is not used in the design review at this moment. At that time, by using the simple derivative data 42 by which the detail of the unit 2 is decreased up to the lowermost layer, it is possible to execute the detailed design review as maintaining the real time of the derivative data.

<Control 2 of Detail in Design Review>

As a request which occurs in the design review, there is the contact judgment to be executed between the units and between the virtual design data 20 and the hand of the operator (observer).

In case of executing the contact judgment, if the detailed data from the virtual design data 20 is used for interference check, a great amount of time is necessary in the calculation process, whereby there is a fear that it impairs the real-time process.

For this reason, the data to be used for display is made different from the data to be used for interference check, and these different data are respectively managed in the integrated information management system 50. By doing so, it is possible to achieve the high-speed interference check and the high-speed display.

In other words, by dynamically managing such interference check data in the integrated information management system 50, it is possible to execute the data management so as to execute, within the virtual data to which it intends to pay attention, the interference check by using the detailed data, and not to execute, within the portion other than the relevant virtual data, the detailed check by using the simplified data.

For example, in a case where the unit 2 is set as the target of the design review, the state management data is changed to represent "display=on", "concealment judgment=on", "contact judgment=off" and "detail=max", and the thus acquired data of the virtual design data 20 is displayed as the data to be displayed.

At the same time, in the unit 2, it is set for the contact judgment that "display=off", "concealment judgment=off", "contact judgment=on" and "detail=3", by using the simplified derivative data 32 of the DMR system 12. Then, the thus acquired data is disposed in the unit 2 as the data dedicated for the contact judgment. By doing so, it is possible not to impair the real time in the contact judgment process with respect to the data which is not the target.

<Example of Superposed Display of Analysis Data>

In a case where the real mockup 33 and the virtual design data 20 are superposed and displayed, it is possible by also managing the derivative data 31 (result data) of the CAE system 11 in the integrated information management system 50 to achieve the more detailed design review.

Incidentally, the data which is acquired as the result of the analysis are the following two data.

1) The data of volume data type which is output by an analysis solver. Ordinarily, these data are not in the state capable of being directly displayed, that is, these data are merely arranged on the volume.

2) The analysis result visualization data which is output by analysis result visualization software. These data are the data which are acquired by extracting only the necessary data on the space and processing the extracted data as a ribbon, a section image or the like so as to be easily recognized by the user.

The above analysis result data are managed in the integrated information management system 50, whereby it is possible to change over and display the data according to observer's need. For example, if all of individual temperature distribution analysis data are displayed, it is possible to execute the display so as to enable the observer to know the tendency of the whole temperature distribution.

As many apparently widely different embodiments of the present invention can be made without departing from the spirit and scope thereof, it is to be understood that the present invention is not limited to the specific embodiments thereof expect as defined in the appended claims.

This application claims priority from Japanese Patent Application Nos. 2005-207135 filed Jul. 15, 2005 and 2006-161028 filed Jun. 9, 2006, which are hereby incorporated by reference herein.

What is claimed is:

1. An image processing device comprising:
a storage device adapted to store three-dimensional virtual design data, which is assembled with a plurality of units of three-dimensional virtual design assembly data, wherein one of the units of three-dimensional virtual design assembly data is virtual mockup design data for creating a real mockup, wherein the real mockup is created based on a shape of the virtual mockup design data;
an image input device adapted to input a real space image including the real mockup, which corresponds to the virtual mockup design data, positioned in a real space;
a first measuring device adapted to measure a position and orientation of the image input device in the real space;
a second measuring device adapted to measure a position and orientation of the real mockup in the real space;
a concealment relationship judgment device adapted to judge a concealment relationship between the virtual mockup design data, which corresponds to the real mockup, and another of the plurality of units of the three-dimensional virtual assembly design data other than the virtual mockup design data in a virtual space, based on the measured position and orientation of the real mockup, which corresponds to the virtual mockup design data, from the measured position and orientation of the image input device;
a virtual image generation device adapted to generate a virtual image from the plurality of units of the three-dimensional virtual assembly design data other than the virtual mockup design data, which corresponds to the real mockup, wherein the virtual image excludes a part of the three-dimensional virtual design data concealed by the virtual mockup design data, based on the judged concealment relationship;
a composite image generation device adapted to generate a composite image from the real space image and the virtual image; and
a display device adapted to display the composite image.

2. An image processing device according to claim 1, wherein a marker is attached to the real mockup, and
wherein said second measuring device is adapted to measure the position and orientation of the real mockup based on a placement of the marker in the real space image and the position and orientation of the image input device.

3. An image processing device according to claim 1, wherein said second measuring device is adapted to measure the position and orientation of the real mockup by a sensor disposed on the real mockup.

4. An image processing device according to claim 1, further comprising:
an analysis calculation device adapted to execute an analysis calculation,
wherein the virtual image generated by said a virtual image generation device includes a result of the analysis calculation.

5. An image processing device according to claim 1, wherein a virtual image generation device includes a three-dimensional virtual design data detail control device adapted to switch a detail level, and
wherein said virtual image generation device is adapted to generate a virtual image, based on the detail level.

6. An image processing device according to claim 1, wherein a plurality of units of the three-dimensional virtual design data exists for each of a plurality of information processing applications.

7. An image processing device according to claim 6, wherein state management data is provided and managed for each of the plurality of units of the three-dimensional virtual design data.

8. An image processing method comprising:
an image inputting step of inputting, by an image input device, a real space image including a real mockup, which corresponds to virtual mockup design data, in a real space, wherein the virtual mockup design data is one of a plurality of units of stored three-dimensional virtual assembly design data, which is used to assemble three-dimensional virtual design data, and the real mockup is created based on a shape of the virtual mockup design data;
a first measuring step of measuring a position and orientation of the image input device in the real space;
a second measuring step of measuring a position and orientation of the real mockup in the real space;
a concealment relationship judgment step of judging a concealment relationship between the virtual mockup design data, which corresponds to the real mockup, and another of the plurality of units of the three-dimensional virtual assembly design data other than the virtual mockup design data in a virtual space, based on the measured position and orientation of the real mockup, which corresponds to the virtual mockup design data, from the measured position and orientation of the image input device;
a virtual image generation step of generating a virtual image from the plurality of units of the three-dimensional virtual assembly design data other than the virtual mockup design data, which corresponds to the real mockup, wherein the virtual image excludes a part of the three-dimensional virtual assembly design data concealed by the virtual mockup design data, based on the judged concealment relationship;
a composite image generation step of generating a composite image of the real space image and the virtual image; and
a display step of displaying the composite image.

9. A storage medium which stores a computer program for causing a computer to achieve an image processing method comprising:
an image inputting step of inputting, by an image input device, a real space image including a real mockup, which corresponds to virtual mockup design data, in a real space, wherein the virtual mockup design data is one of a plurality of units of stored three-dimensional virtual assembly design data, which is used to assemble three-dimensional virtual design data, and the real mockup is created based on a shape of the virtual mockup design data;
a first measuring step of measuring a position and orientation of the image input device in the real space;
a second measuring step of measuring a position and orientation of the real mockup in the real space;
a concealment relationship judgment step of judging a concealment relationship between the virtual mockup design data, which corresponds to the real mockup, and another of the plurality of the three-dimensional virtual assembly design data other than the virtual mockup design data in the virtual space, based on the measured position and orientation of the real mockup, which corresponds to the virtual mockup design data, from the measured position and orientation of the image input device;

a virtual image generation step of generating a virtual image from the plurality of units of the three-dimensional virtual assembly design data other than the virtual mockup design data, which corresponds to the real mockup, wherein the virtual image excludes a part of the three-dimensional virtual assembly design data concealed by the virtual mockup design data, based on the judged concealment relationship;

a composite image generation step of generating a composite image from the real space image and the virtual image; and a display step of displaying the composite image.

* * * * *